US009981209B2

(12) United States Patent
Cook et al.

(10) Patent No.: US 9,981,209 B2
(45) Date of Patent: May 29, 2018

(54) THICKENER FEED DISTRIBUTOR (71) Applicant: Paterson & Cooke Ideas, Ltd., Golden, CO (US)

(72) Inventors: Michael A. Cook, Golden, CO (US); Christian Kujawa, Golden, CO (US)

(73) Assignee: Paterson & Cooke Ideas, Ltd., Golden, CO (US)

( * ) Notice: Subject to any disclaimer, the term of this patent is extended or adjusted under 35 U.S.C. 154(b) by 35 days.

(21) Appl. No.: 15/074,410

(22) Filed: Mar. 18, 2016

(65) Prior Publication Data

US 2016/0271527 A1 Sep. 22, 2016

Related U.S. Application Data

(60) Provisional application No. 62/135,497, filed on Mar. 19, 2015.

(51) Int. Cl.
*B01D 21/24* (2006.01)
*B01D 21/00* (2006.01)

(52) U.S. Cl.
CPC ..... *B01D 21/2416* (2013.01); *B01D 21/0024* (2013.01); *B01D 21/0087* (2013.01); *B01D 21/2411* (2013.01); *B01D 21/2427* (2013.01)

(58) Field of Classification Search
CPC ............ B01D 21/0024; B01D 21/0087; B01D 21/2405; B01D 21/2411; B01D 21/2416; B01D 21/2427

(Continued)

(56) References Cited

U.S. PATENT DOCUMENTS 1,065,542 A * 6/1913 Main .................... B01D 21/245
210/519
1,452,016 A 4/1923 Allen
(Continued)

FOREIGN PATENT DOCUMENTS

AU 2010241350 A1 12/2010
CA 2254896 A1 11/1997
(Continued)

OTHER PUBLICATIONS

"Developing a Global Footprint and Revolutionising Thickeners and Other Equipment", Inside Mining 2012 Minerals Processing, Apr. 2012, 54-55.
(Continued)

*Primary Examiner* — Christopher Upton
(74) *Attorney, Agent, or Firm* — Deborah A. Peacock; Justin R. Jackson; Peacock Law P.C.

(57) ABSTRACT

A feedwell comprising a plurality of holes disposed in a bottom thereof, at least some of the holes having a tube disposed thereabout which extends downward or otherwise away from an interior of the feedwell. Optionally, a large center hole can be provided and it can have a tube disposed around it. By providing a plurality of holes spread across a large portion of the bottom of the feedwell, lower velocity flow rates from the feedwell to a sedimentation chamber can be provided, thus reducing induced turbulence in the fluid within the sedimentation chamber, while still providing sufficient separation of the feedwell from the sedimentation chamber so that the contents of the feedwell can be properly and adequately mixed.

29 Claims, 13 Drawing Sheets

(58) Field of Classification Search
USPC .............................. 210/801, 519; 3/801, 519
See application file for complete search history.

(56) References Cited

U.S. PATENT DOCUMENTS

| | | | |
|---|---|---|---|
| 2,602,465 A * | 7/1952 | Goehring | B65D 88/54 |
| | | | 210/519 |
| 3,228,530 A * | 1/1966 | Quast | B01D 21/2405 |
| | | | 210/519 |
| 3,434,598 A | 3/1969 | Daman | |
| 3,770,131 A | 11/1973 | Davis et al. | |
| 4,054,514 A | 10/1977 | Oltmann | |
| 4,193,877 A | 3/1980 | Lillywhite | |
| 4,270,676 A | 6/1981 | Green | |
| 4,272,369 A | 6/1981 | Love | |
| 4,427,551 A | 1/1984 | Duveau | |
| 4,541,850 A | 9/1985 | Oda et al. | |
| 5,015,392 A * | 5/1991 | Taylor | B01D 21/0024 |
| | | | 210/519 |
| 5,271,853 A * | 12/1993 | Batten | B01D 17/0208 |
| | | | 210/519 |
| 5,944,995 A | 8/1999 | Sethi et al. | |
| 6,276,537 B1 | 8/2001 | Esler et al. | |
| 6,766,909 B2 | 7/2004 | Kujawa | |
| 6,832,690 B2 | 12/2004 | Kujawa | |
| 6,966,985 B2 * | 11/2005 | Schoenbrunn | B01D 21/2427 |
| | | | 210/519 |
| 7,494,592 B2 | 2/2009 | Deskins | |
| 7,520,995 B2 | 4/2009 | Taylor et al. | |
| 7,591,946 B2 | 9/2009 | Taylor | |
| 7,988,865 B2 | 8/2011 | Laros et al. | |
| 8,021,559 B2 | 9/2011 | Triglavcanin | |
| 8,197,697 B2 | 6/2012 | Triglavcanin | |
| 8,276,761 B2 | 10/2012 | Kujawa | |
| 8,440,087 B2 | 5/2013 | McElvenny | |
| 8,889,012 B2 | 11/2014 | Turner | |
| 2005/0155917 A1 | 7/2005 | Taylor et al. | |
| 2006/0006114 A1 | 1/2006 | Deskins | |
| 2010/0300546 A1 | 12/2010 | McElvenny | |
| 2011/0079563 A1 | 4/2011 | Triglavcanin et al. | |
| 2011/0132846 A1 | 6/2011 | Laros et al. | |
| 2011/0132850 A1 | 6/2011 | Lake et al. | |
| 2011/0233134 A1 * | 9/2011 | Robert | B01D 21/2416 |
| | | | 210/519 |
| 2011/0247987 A1 | 10/2011 | Triglavcanin | |
| 2014/0008293 A1 | 1/2014 | Sury et al. | |

FOREIGN PATENT DOCUMENTS

| | | |
|---|---|---|
| CA | 2479326 | 9/2003 |
| CA | 2722277 A1 | 6/2011 |
| CN | 101569802 B | 4/2011 |
| CN | 104208923 A | 12/2014 |
| EP | 2329871 A1 | 6/2011 |
| WO | 0119488 A1 | 3/2001 |
| WO | 2009070831 A1 | 6/2009 |
| WO | 2013171652 A1 | 11/2013 |

OTHER PUBLICATIONS

"Filters and Thickeners", Engineering & Mining Journal, Mar. 2014, 48-52.
"Optimal Operating Thickener", Paterson & Cooke 2014 Thickener Fundamentals & Operation Course, 2014.
"WesTech EvenFlo Feedwell", Dec. 17, 2014.
Echeverri, et al., "Optimization of the Hydraulic Design of Thickener Feedwells Applying Computational Fluid Dynamics and Experimental Techniques", SME Preprint 12-106, 2012.
Krassnokutski, "A Look at the Next Generation of Thickener Feedwells", Chemical Technology, Feb. 2012, Feb. 2012, 28-30.
Krassnokutski, "RadFlow™—The Next Generation Feedwell", Feb. 3, 2015.
Nguyen, et al., "Design and Development of a Novel Thickener Feedwell using Computational Fluid Dynamics", The Journal of the Southern African Institute of Mining and Metallurgy, vol. 112, Nov. 2012, 939-948.

* cited by examiner

Fig. 8

THICKENER FEED DISTRIBUTOR

CROSS-REFERENCE TO RELATED APPLICATIONS

This application claims priority to and the benefit of the filing of U.S. Provisional Patent Application Ser. No. 62/135,497, entitled "Thickener Feed Distributor", filed on Mar. 19, 2015, and the specification and claims thereof are incorporated herein by reference.

BACKGROUND OF THE INVENTION

Field of the Invention (Technical Field)

Embodiments of the present invention relate to feedwells for mineral processing plant thickeners and clarifiers. More particularly, embodiments of the present invention relate to feedwells having a plurality of openings disposed on a lower portion thereof for more uniform distribution of fluids from the feedwell into fluids disposed in a sedimentation chamber (also known as a thickener tank) disposed there below.

Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

For a feedwell to provide desirable results, it must permit components to be mixed and retained therein and thus have rather substantial and appropriate fluid kinetics. However, the feedwell should also isolate, to the greatest extent possible, such fluid kinetics from the contents of the sedimentation chamber, while still permitting a sufficient fluid flow rate from the feedwell to the sedimentation tank to accomplish a desired overall feed flow rate.

A typical feedwell is shown and described in U.S. Patent Pub. No. 2011/0079563 (the '563 application), having a single, large outlet as shown in the figures thereof (reference numeral 8). Such feedwells are common and have the characteristic downside of forcing all contents of the feedwell to escape through a single large opening in the bottom. Such a configuration enhances turbulence and creates undesirable flow patterns within the upper portion of the sedimentation chamber within which it is disposed. Although the '563 application seeks to reduce such turbulence by disposing a plurality of fins into the single large opening, such fins themselves disturb the flow of the exiting fluid, thus enhancing the turbulence induced within the sedimentation chamber, which is an undesirable characteristic.

Some inventions, such as that disclosed in U.S. Pat. No. 7,591,946 to Taylor, seek to minimize the induced turbulence by forcibly mixing the contents of its feedwell in a lower portion thereof and forcing the contents of the feedwell to escape therefrom at an upper opening through a Bundt pan shape. By forcing the discharge of the feedwell to be concentrated near a central bottom portion of the feedwell, the flow rate of the discharge is thus comparatively larger than would occur if Taylor instead spread the discharge of the feedwell out over a much larger area.

Like other known feedwell designs, U.S. patent application Ser. No. 12/633,527 to Lake et al. also describes a feedwell with a single large opening disposed in its lower portion. Thus, this invention also suffers from the same undesirable turbulence and flow patterns that are induced in the sedimentation chamber as the other known systems.

U.S. patent application Ser. No. 12/745,891 to McElvenny also discloses a feedwell with a single large opening on its bottom. The apparatus disclosed in this application, however, attempts to mitigate the disturbance to the liquid in the sedimentation chamber by placing a conical plate directly below the outlet of the feedwell so as to spread out the flow of fluid exiting the feedwell into a larger ring-shape. However, even this proposed solution does not distribute the outflow of the feedwell over a significant area, because the very plate itself blocks a significant area below the flow in which some of the outflow could travel.

Other systems have also been developed which seek to make the outflow of the feedwell more uniform by incorporating a flow-shaping zone near the single large outlet of the feedwell. However, the result is still substantially the same—the entire outflow of the feedwell is concentrated in a single entry point in the sedimentation chamber, thus inducing turbulence in the contents of the sedimentation chamber.

There is thus a present need for a method and apparatus which provides a feedwell that distributes the outflow of the feedwell into the sedimentation chamber over a vastly large area so as to minimize turbulence in the contents of the sedimentation chamber.

BRIEF SUMMARY OF THE INVENTION

An embodiment of the present invention relates to a feedwell having a feed inlet, a sidewall, a bottom, at least three holes disposed in the bottom of the feedwell, and a tube disposed around at least one of the holes and projecting down or otherwise away from an interior of the feedwell. Optionally, at least a majority of the holes each comprise a corresponding tube. One or more of the tubes can have a length which is greater than at least one half of the diameter of the corresponding hole about which or within which it is disposed. The feedwell can have at least 12 holes and optionally at least 36 holes disposed in its bottom. In one embodiment, the hole size can be several times the diameter of an expected floccule, thus permitting floccules to pass through the holes without being broken down. The feedwell can also include an inlet and/or at least one opening in its sidewall. Optionally, a plurality of openings can be disposed in a sidewall of the feedwell. The openings can be disposed in an upper half of the sidewall.

In one embodiment, the feedwell can comprise a comparatively large opening in the center of the bottom of the feedwell. Optionally, the central opening can comprise a cross-sectional area that is two or more times larger than a cross-sectional area of one of the other holes disposed in the bottom of the feedwell.

An embodiment of the present invention also relates to a feedwell having a sidewall, a bottom, a first opening in the bottom, a plurality of second openings in the bottom, each of the plurality of second openings having a cross-sectional area which is less than one-half of a cross-sectional area of said first opening; and at least some of the second openings comprising a corresponding tube disposed around the openings which projects down or away from an interior of the feedwell. Optionally, the feedwell can have a bottom that is downwardly-depending and cone-shaped. A velocity and/or a flow rate regulator 40 can be communicably coupled to one or more of the holes.

An embodiment of the present invention also relates to a method for dispensing contents of a feedwell into a sedimentation chamber which includes passing the contents from within the feedwell through a plurality of openings disposed in a bottom of the feedwell, wherein the plurality of openings number at least six openings. The method can also include guiding at least some of the contents from within the feedwell to a location within the sedimentation chamber by directing them through one or more tubes disposed around at least some of the openings. Optionally, at least three openings can be disposed in the bottom of the feedwell. Preferably, the openings and tubes are consistent in design radially.

Embodiments of the feedwell of the present invention permit deaeration, mixing at the right energy level, flocculation, and solids contact therein. The holes allow the feed to be evenly distributed into a sedimentation chamber in a controlled manner with little turbulence. Feedwells according to embodiments of the present invention maintain retention required for optimal mixing. The tubes connected to the holes in the bottom of the feedwell allows for instantaneous recovery of the liquid via the open channels which can be created with an off-set pattern in the layout. The liquid can be recovered very close to the feedwell underside, thereby shortcutting the typical scenario which is normally only achieved lower in the thickener. This process in known systems is often hindered by settling solids, rise rates, and other dynamics within the thickener proper.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Embodiments of the present invention relate to a feedwell for a thickener or clarifier, also generally referred to as a "thickener feed distributor." The thickeners and clarifiers, used in mineral processing plants, rely on compartments or "feedwells" located at an upper center portion of a sedimentation chamber. The purpose of such feedwells is to deaerate the feed; permit introduction and mixing of slurries, flocculant, dilution water, or materials to a homogenous state; promote rapid flocculant/particle aggregate formation; capture fine and coarse particles into flocculant/particle aggregate formation through mixing at the right energy levels; prevent break-down of such flocculant/particle aggregates through excessive energy levels; and then simultaneously allow such materials to enter the sedimentation chamber with as little turbulence as possible after having been mixed so as to avoid agitating the sedimentation process. Fluid flow plays a major role in these sedimentation units and their successful operation depends, to a large extent, on having a feedwell correctly designed for the particular application.

Referring now to the drawings, feedwell 10 preferably comprises sidewall 12 and bottom 14. Bottom 14 preferably comprises a plurality of holes 16. Holes 16 preferably comprise tubes 18 disposed around holes 16. Tubes 18 are preferably disposed on the outside portion of feedwell 10 and thus extend away from an interior of feedwell 10. Holes and tubes are preferably radially consistent in pattern or design. An embodiment of the present invention also relates to a method and apparatus for controlling and/or regulating the flow rate and/or exit velocity of the contents of feedwell 10 through holes 16 in bottom 14 of feedwell 10. This can be achieved by a self-regulating or adjustable valve, a one way valve, one directional flap, a port, a diaphragm, combinations thereof, and the like, which can be incorporated into and/or attached to one or more of holes 16 and/or tubes 18 of feedwell 10. In one embodiment, feedwell 10 comprises a generally circular shape. In an alternative embodiment, feedwell 10 does not comprise a generally circular shape.

In one embodiment, in addition to a plurality of holes 16, a large hole 20 is preferably disposed in a central portion of bottom 14 of feedwell 10. Hole 20 also preferably has tube 22 disposed around it and tube 22 also is preferably disposed on an outside portion of feedwell 10 and thus extends away from an interior of feedwell 10. Although a preferred embodiment provides feedwell 10 having a generally cylindrical shape, feedwell 10 need not be limited only to generally cylindrical shapes and can comprise any shape which permits materials to be mixed or clarified, including but not limited to rectangular, square and other shapes.

Although holes 16 can comprise any shape, including but not limited to triangular, square, rectangular, oval, etc., in a preferred embodiment, holes 16 are most preferably circular in shape. For embodiments in which non-circular shaped holes 16 are provided, tubes 18 preferably comprise a similar shape to non-circular holes 16. Optionally, holes 16 need not all be the same shape and size. For example, some of holes 16 can be large squares, small squares, large rectangles, small rectangles, large triangles, small triangles, large circles and small circles. Optionally, the shapes and/or sizes of holes 16 can progressively change as they approach the center of bottom 14 or they can be interspersed in patterns or randomly. For example, in one embodiment, the holes nearest sidewall 12 can comprise a diameter which is smaller than those which are near the center of bottom 14. Although the number and spacing of holes 16 can be varied to provide specific results for a particular application and for different sizes of feedwells, in one embodiment, there are at least three holes 16, at least 6 holes 16, at least 12 holes 16, at least 24 holes 16, at least 32 holes 16, at least 36 holes 16, or at least 60 holes 16.

Figure 1:
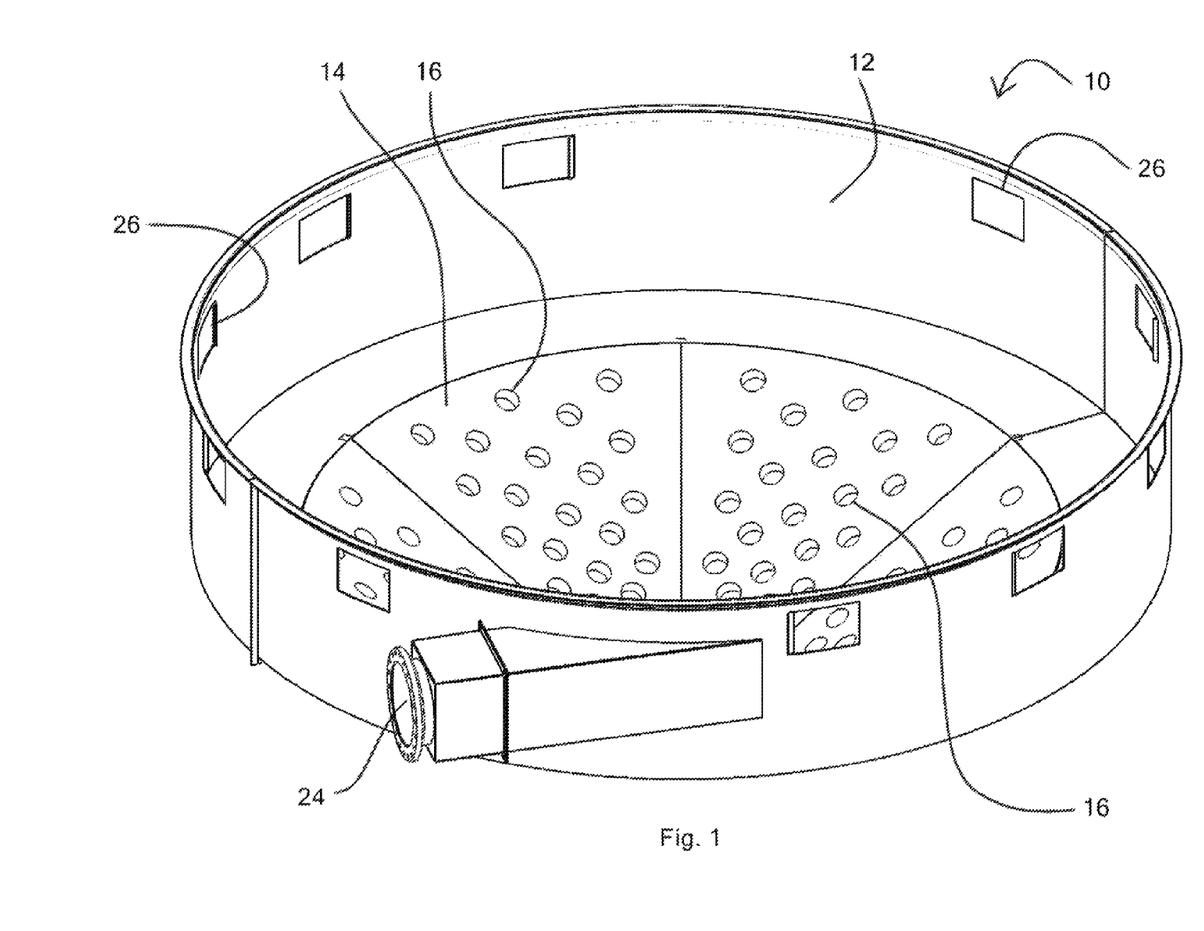
FIG. 1 is an elevated side-view drawing which illustrates a feedwell according to an embodiment of the present invention.
Figure 2:
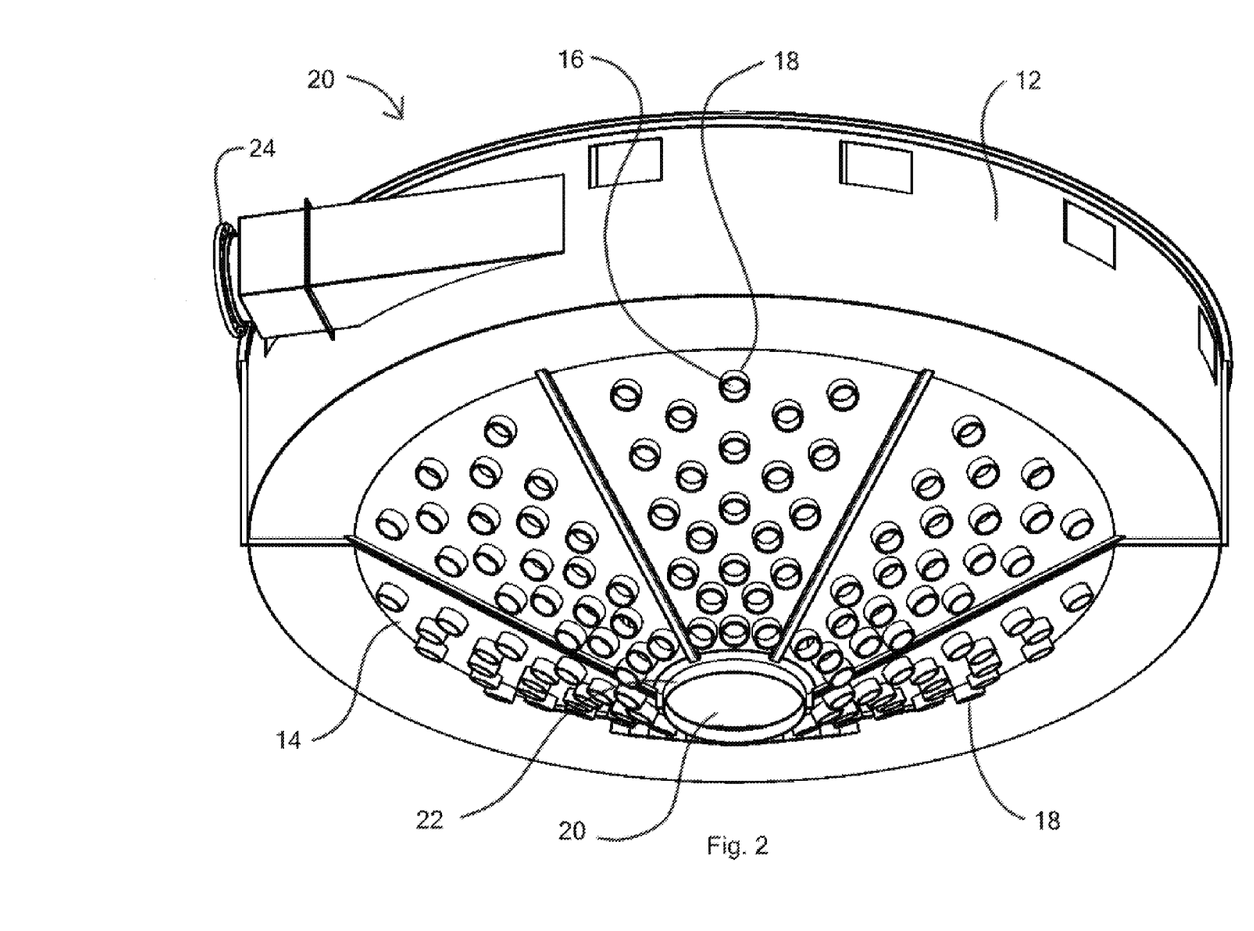
FIG. 2 is a drawing which illustrates an underside of a feedwell according to an embodiment of the present invention.
Figure 3:
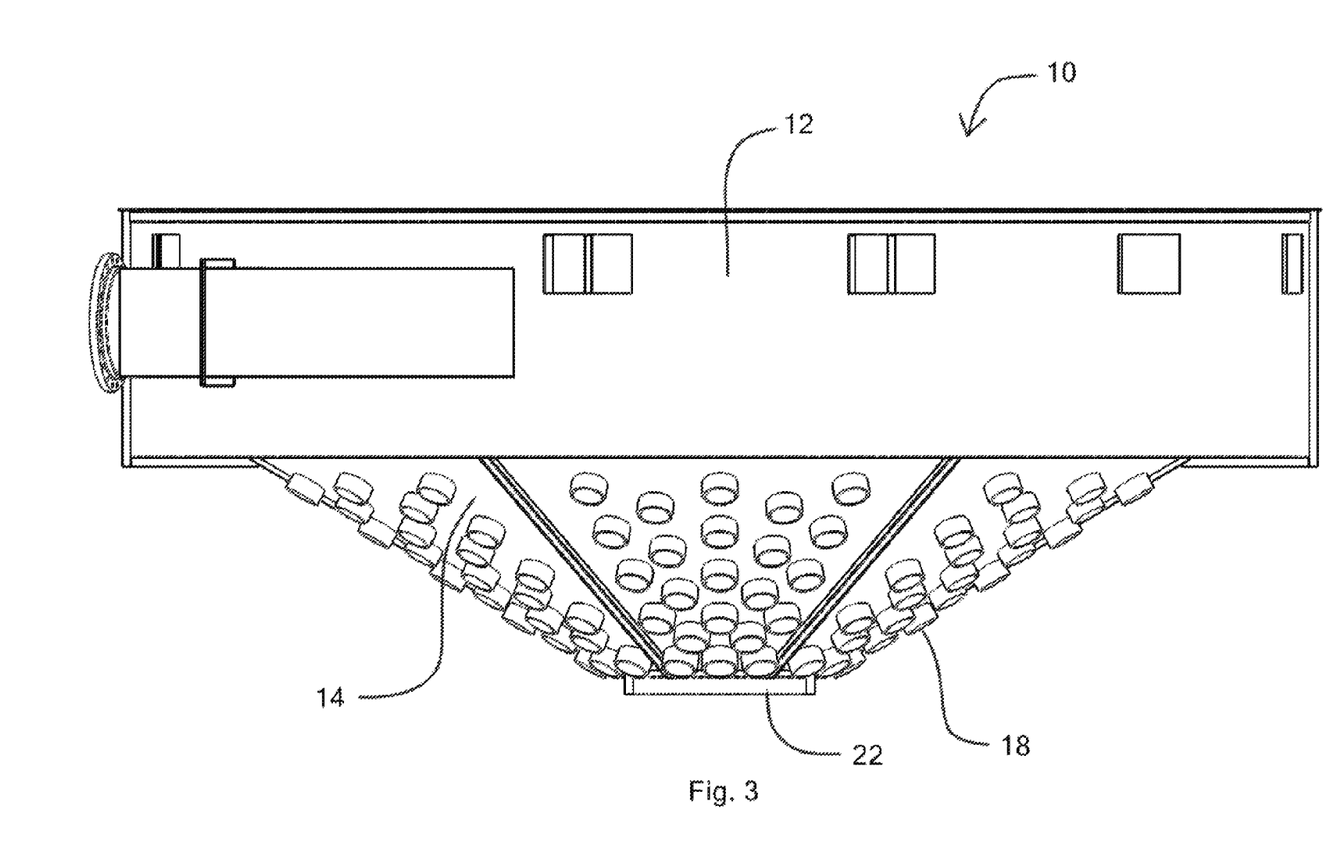
FIG. 3 is a side-view drawing of a feedwell according to an embodiment of the present invention.
Figure 4:
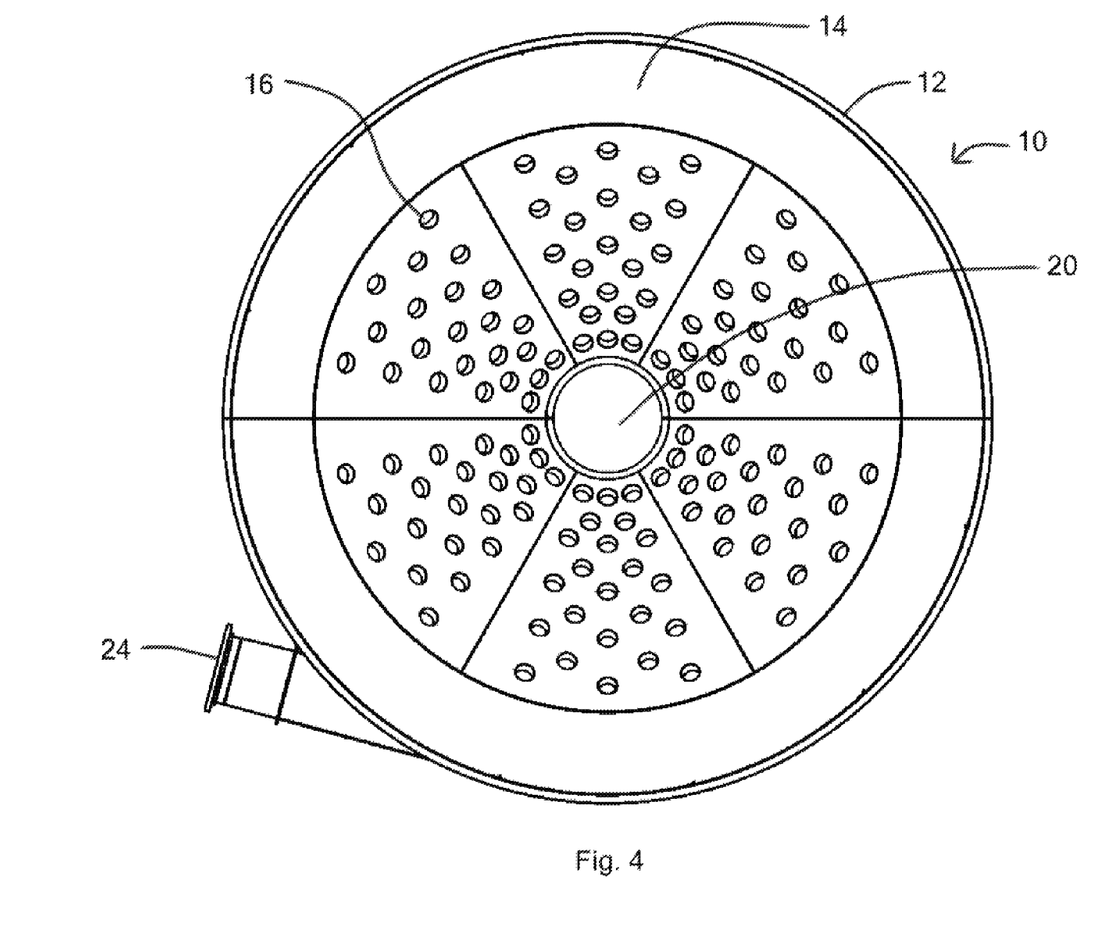
FIG. 4 is a top-view drawing of a feedwell according to an embodiment of the present invention.

In one embodiment, bottom 14 of feedwell 10 can be flat or at least substantially flat. However, in a preferred embodiment, at least a portion of bottom 14 comprises a concave or conical shape, such as that illustrated in the figures. Optionally, a portion of bottom 14 nearest sidewall 12 can be flat while the rest of bottom 14 can have a concave shape (see for example FIGS. 1 and 2). If the feed to the feedwell is tangential to a nearest sidewall, a flat portion of the bottom of the feed inlet nearest the sidewall is preferably proportional in width to the feed flow rate. In one embodiment, the flat portion of the feedwell is preferably below the bottom of the feed inlet by approximately the feed inlet height.

Tubes 18 can optionally comprise a length which is uniform to each of holes 16. Optionally, however, some of tubes 18 can have a length which is longer or shorter than other tubes 18. For example, in one embodiment, tubes 18 of holes 16 nearest sidewall 12 can have a length which is short in relation to tubes 18 of holes 16 which are nearest the center of bottom 14. Optionally, the length of tubes 18 can be varied in a consistent manner—for example, the tubes nearest sidewall 12 can be long and each tube nearer to a center of bottom 14 can be progressively larger such that tubes 18 nearest the bottom are longer than tubes 18 which are nearest sidewall 12 (or vice-versa). Alternatively, the length of tubes 18 can be varied in some predetermined pattern or can be varied randomly. In one embodiment, wherein feedwell 10 comprises holes 16 with varying diameters, the length of tubes 18 can also vary as their diameters vary—optionally, the length of a tube 18 can relate directly to the diameter of its accompanying hole 16. In one embodiment, the length of a tube is preferably at least half of the diameter of its accompanying hole. For example, if a first hole 16 is small and a second hole 16 is large, the length of the tube on the small first hole can be short and the length of the tube on the large second hole can be long. Optionally, tubes 18 can be connected to bottom 14 such that they project down or otherwise away from an interior of feedwell 10 in a desired and predetermined direction. For example, in one embodiment, wherein feedwell 10 comprises a flat bottom, tubes 18 nearest sidewall 12 can have their proximal end cut at an angle, such as for example 45 degrees. This outer ring of tubes can be oriented such that they project down or otherwise away from a center of bottom 14 at a 45 degree angle, and a row of tubes 18 further away from sidewall 12 can have their proximal ends cut at some other angle, for example, 30 degrees, etc. In such a configuration, the outer-most tubes 18 can be directed in a direction different from that of other tubes. Of course these are merely illustrative examples that one or more of tubes 18 can be made to point in a different direction than other tubes 18. In one embodiment, tubes 18 can be arranged in a radially consistent pattern.

Optionally, all or some of tubes 18 can be made long and can comprise one or more bends. For example, in one embodiment, tubes 18 nearest sidewall 12 can comprise a bend and can be extended such that they project radially just below sidewall 12. Further, providing tubes 18 connected to one or more of holes 16 permit a user to design a specific-purpose feedwell system which permits fluids to exit feedwell 10 and be piped directly to any desired location within a sedimentation chamber. In one embodiment, the hole and tube arrangement is preferably radially consistent in pattern for a round sedimentation chamber.

In one embodiment, tubes 18 can connect to bottom 14 via a removable connection. For example, tubes 18 can screw onto short nipples or other fittings such that a user can selectively connect tubes of different lengths, shapes, and/or sizes about any of holes 16. Optionally, placement, size, and/or shape of holes 16 can be determined based on computer modeling for a particular application. In one embodiment, each of holes 16 comprise a corresponding tube 18. In an alternative embodiment, a majority of holes 16 comprise a corresponding tube 18. In yet a further embodiment, only one or some of holes 16 comprise a corresponding tube 18. In an alternative embodiment, none of holes 16 comprise a corresponding tube 18.

In one embodiment, central hole 20 can be significantly larger than any of holes 16. Alternatively, however, hole 20 can be slightly larger, the same size as, or even smaller than any of holes 16. In a further embodiment, hole 20 and/or tube 22 are not provided. Tube 22 can have the same length as tubes 18 or it can be shorter or longer than tubes 18. As with tubes 18, tube 22 can also comprise any desired length and can be shaped in a number of ways such as concave-shape or cone shape and can connect to a connector, including but not limited to a nipple, which is attached to bottom 14 of feedwell 10. Optionally tubes 18 and/or 22 can comprise one or more structures disposed therein which promote a laminar flow therefrom. For example, an array of smaller diameter tubes can be packed or otherwise formed within tubes 18 and/or 22.

Fluid preferably enters feedwell 10 via inlet 24. Optionally, a plurality of inlets 24 can be provided. Inlet 24 is preferably positioned on sidewall 12 and is most preferably positioned such that fluid entering feedwell 10 enters tangentially. Alternatively, however, inlet 24 can be disposed such that fluid enters into the open top of feedwell 10. Also, inlet 24 can be positioned such that fluid does not enter tangentially into feedwell 10. In one such embodiment, the feed can be introduced to feedwell 10 so that a radially inward or outward flow pattern is created. In a further embodiment, more than one inlet 24 can be provided. For example, in one embodiment, a first inlet can be configured to force incoming fluid to enter feedwell 10 in a counter-clockwise manner and a second inlet can be configured to also enter feedwell 10 in a counter-clockwise manner but at a location on an opposite side of feedwell 10 from the first inlet, thus promoting circulation. Alternatively, however, in some applications where increased turbulence is desired within feedwell 10, the second inlet can be configured to enter feedwell 10 in a clockwise direction, thus forcing the incoming fluid streams to collide against one another. Like tubes 18 and 22, one or more structures can be disposed or formed within inlet 24 which promote a laminar flow or any other flow pattern desired for a particular application.

In one embodiment, sidewall 12 can comprise a solid structure. In an alternative embodiment, sidewall 12 is not provided at all. In this embodiment, bottom 14 can be conical or otherwise downwardly-depending and inlet 24 can simply enter into the downwardly-depending bottom structure. In one embodiment, feed dilution can be carried out before the introduction of the feed to feedwell 10. In an alternative embodiment, however, one or more openings 26 (see FIG. 1) can be provided in sidewall 12, or of the conical or downwardly-depending structure, for embodiments which do not comprise a sidewall. Openings 26 can comprise any shape or combination of shapes and can be disposed in a predetermined pattern or at random. In a preferred embodiment, however, openings 26 are disposed near an upper edge of sidewall 12, or an upper half of sidewall 12, or the conical or downwardly-depending structure, for embodiments which do not comprise a sidewall, such that supernatant or dilution liquid can easily pass into the upper portion of feedwell 10 to dilute the contents thereof. In one embodiment, openings 26 are positioned near a top portion of sidewall 12 at a location which is left of inlet 24. Optionally, one or more openings 26 can comprise a damper or other closable structure which reduces the size of openings 26 so that a user can adjust the size and number of openings 26 to meet a desired dilution rate.

Figure 5:
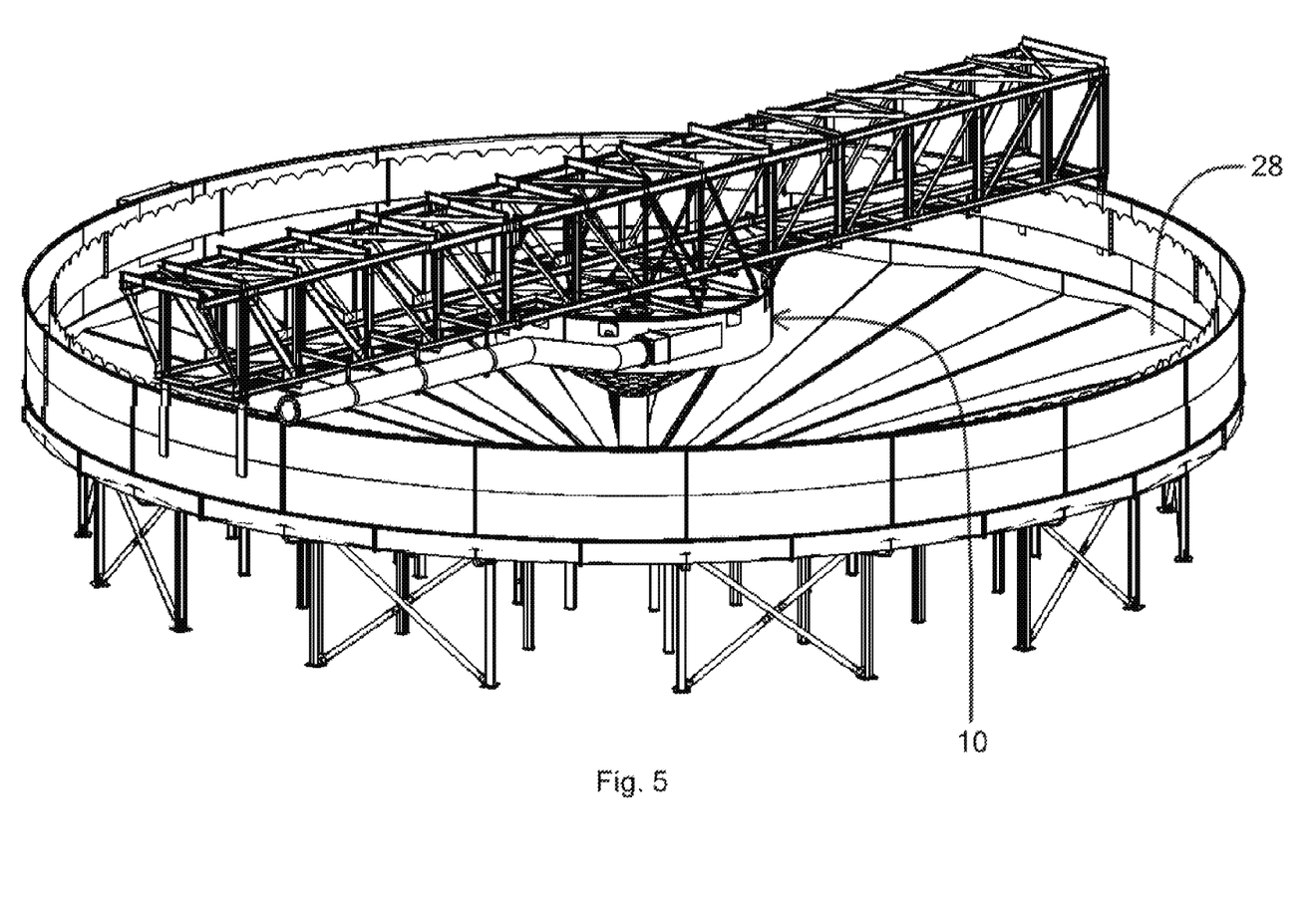
FIG. 5 and FIG. 6 are elevated side-view drawings which illustrate a feedwell according to an embodiment of the present invention disposed within a sedimentation chamber.
Figure 6:
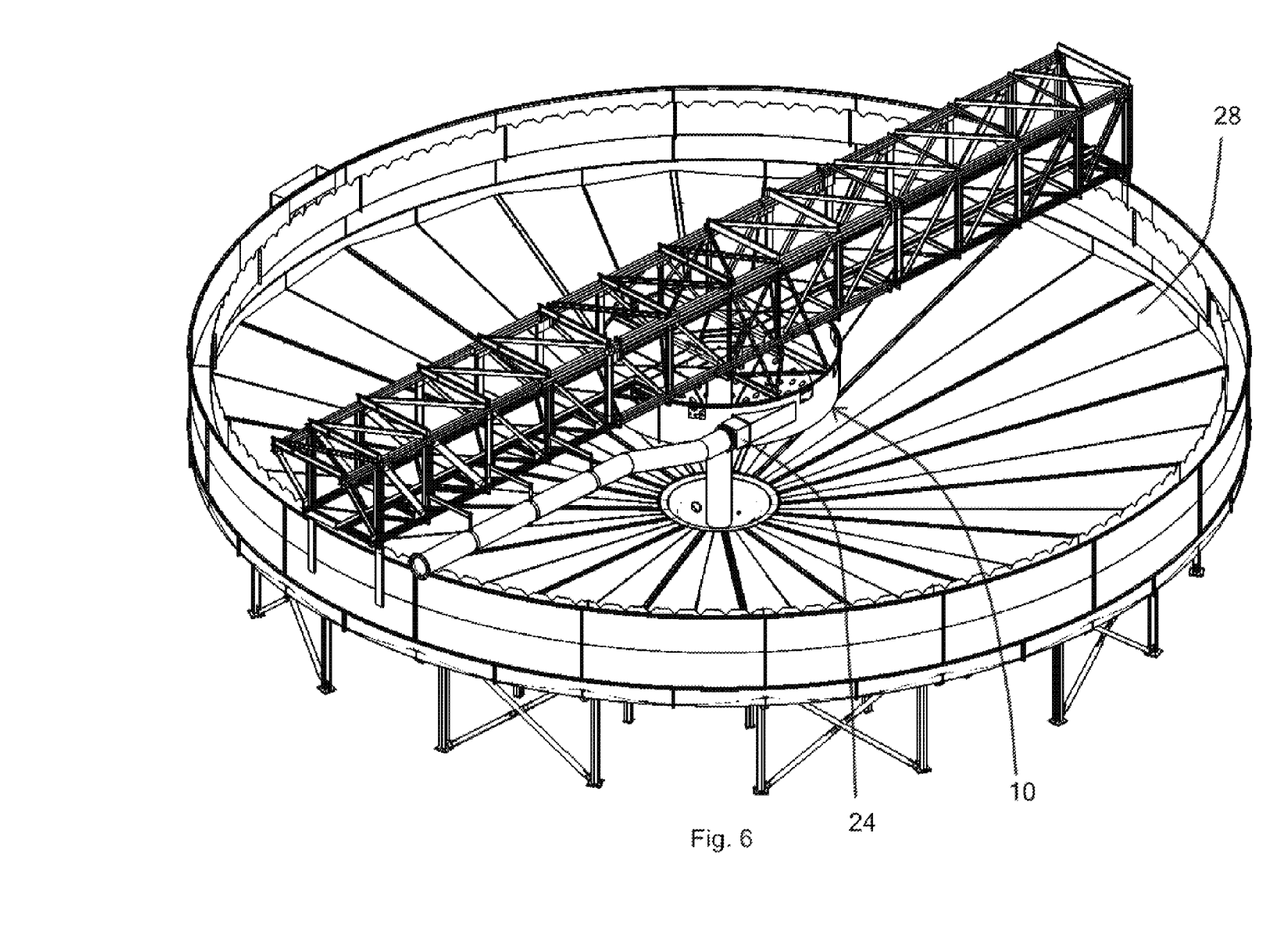
Figure 7:
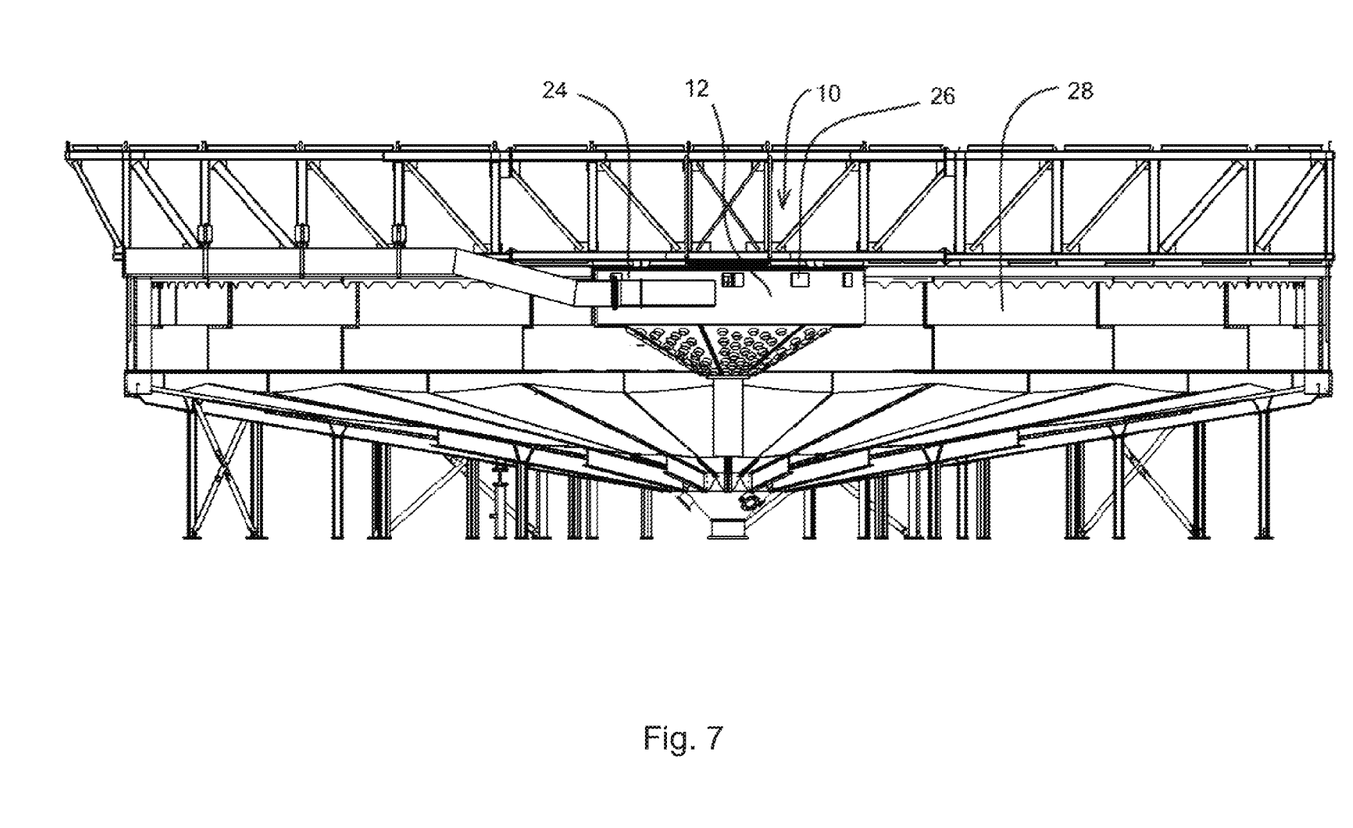
FIG. 7 is a section-view/cutaway drawing which illustrates a feedwell according to an embodiment of the present invention disposed in a sedimentation chamber.

In one embodiment, feedwell 10 can be disposed such that it hangs just above or slightly into a surface of fluid in sedimentation chamber 28. In a preferred embodiment, however, feedwell 10 is most preferably positioned such that a significant portion of it is submerged within the fluid contained in sedimentation chamber 28 (see FIGS. 5-7 which illustrate a most preferred placement of feedwell 10 with regard to sedimentation chamber 28).

Figure 8:
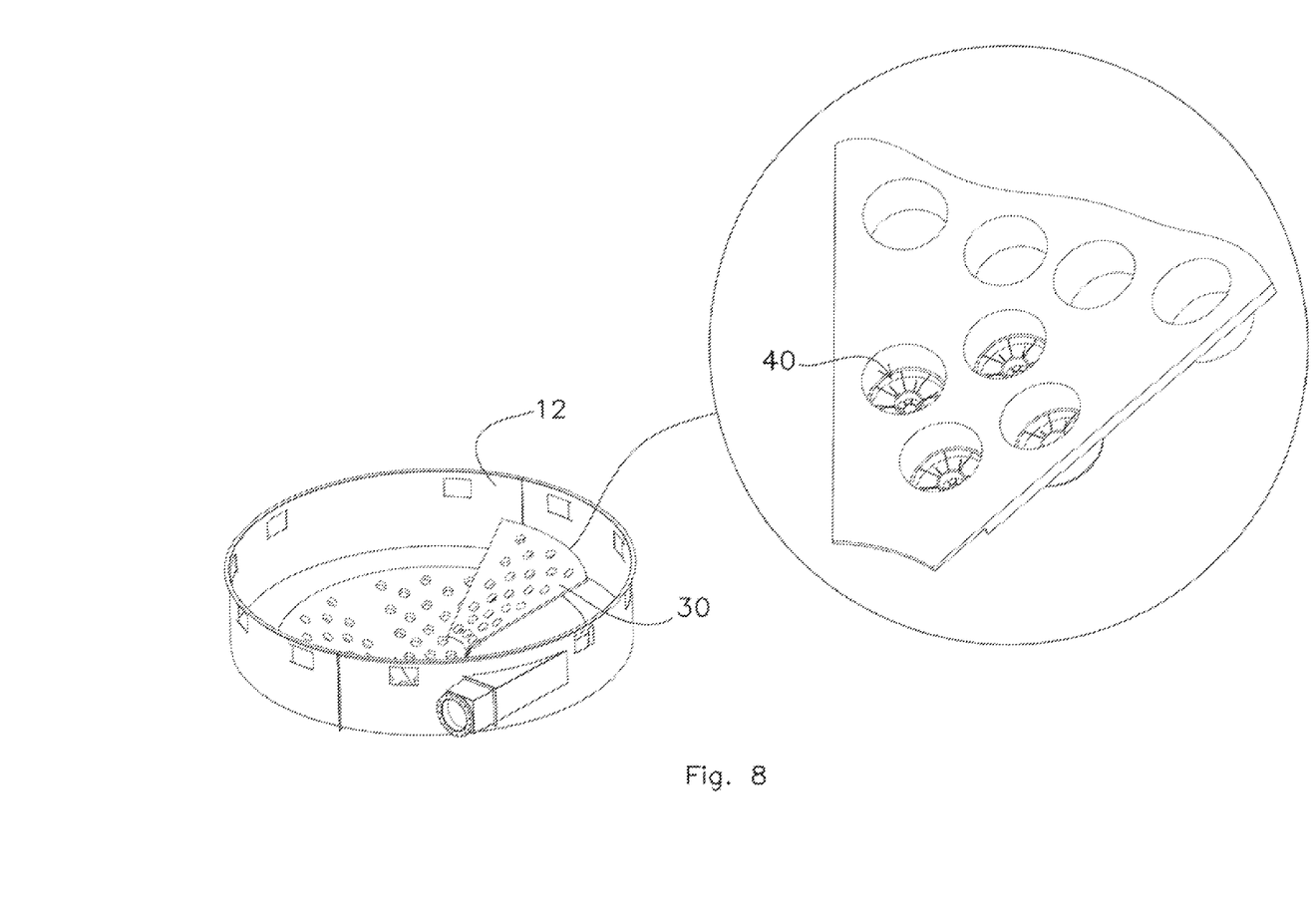
FIG. 8 is a side-view drawing of a feedwell illustrating the modular bottom floor construction according to an embodiment of the present invention.
Figure 9A:
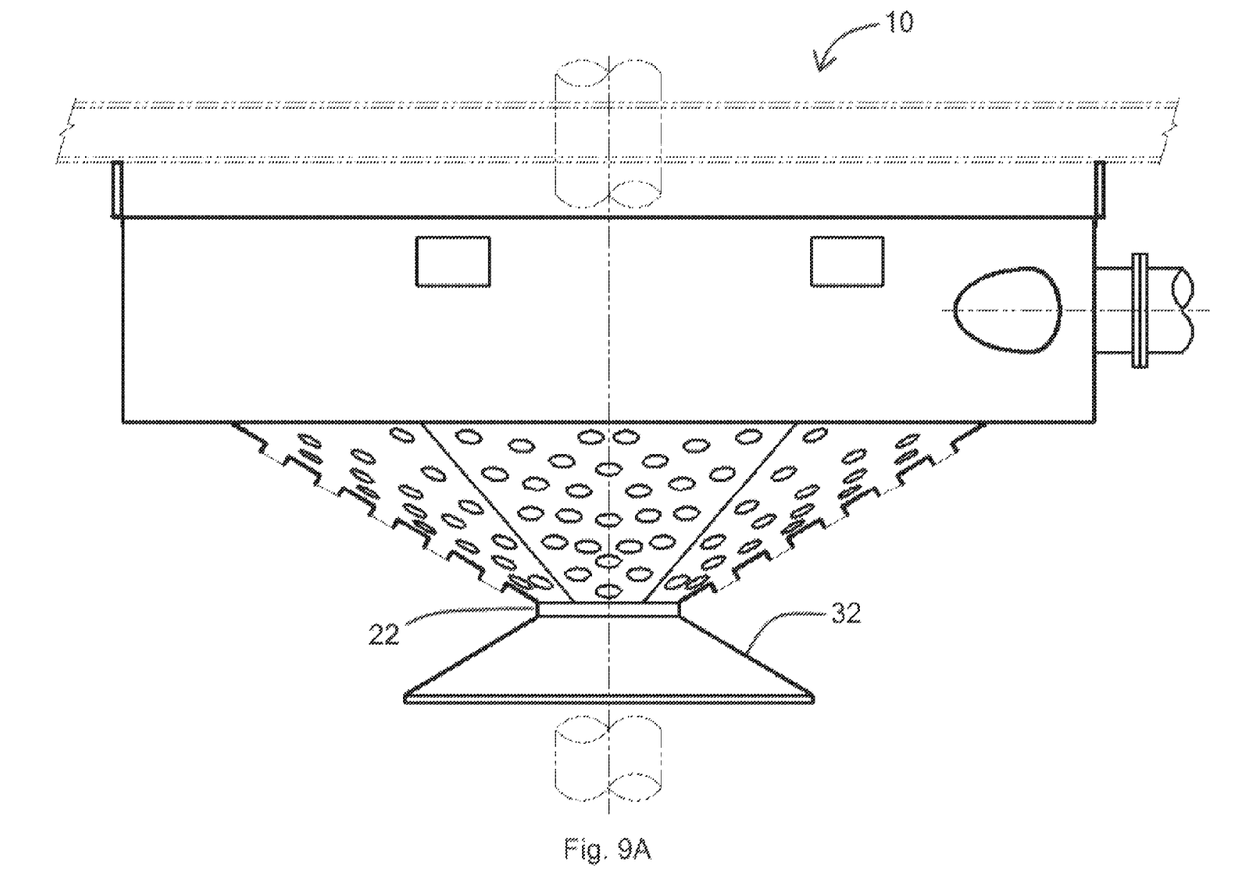
FIG. 9A and FIG. 9B are side-view drawings which illustrate an embodiment of the present invention wherein a fluid-flow modification structure is disposed below the feedwell.
Figure 9B:
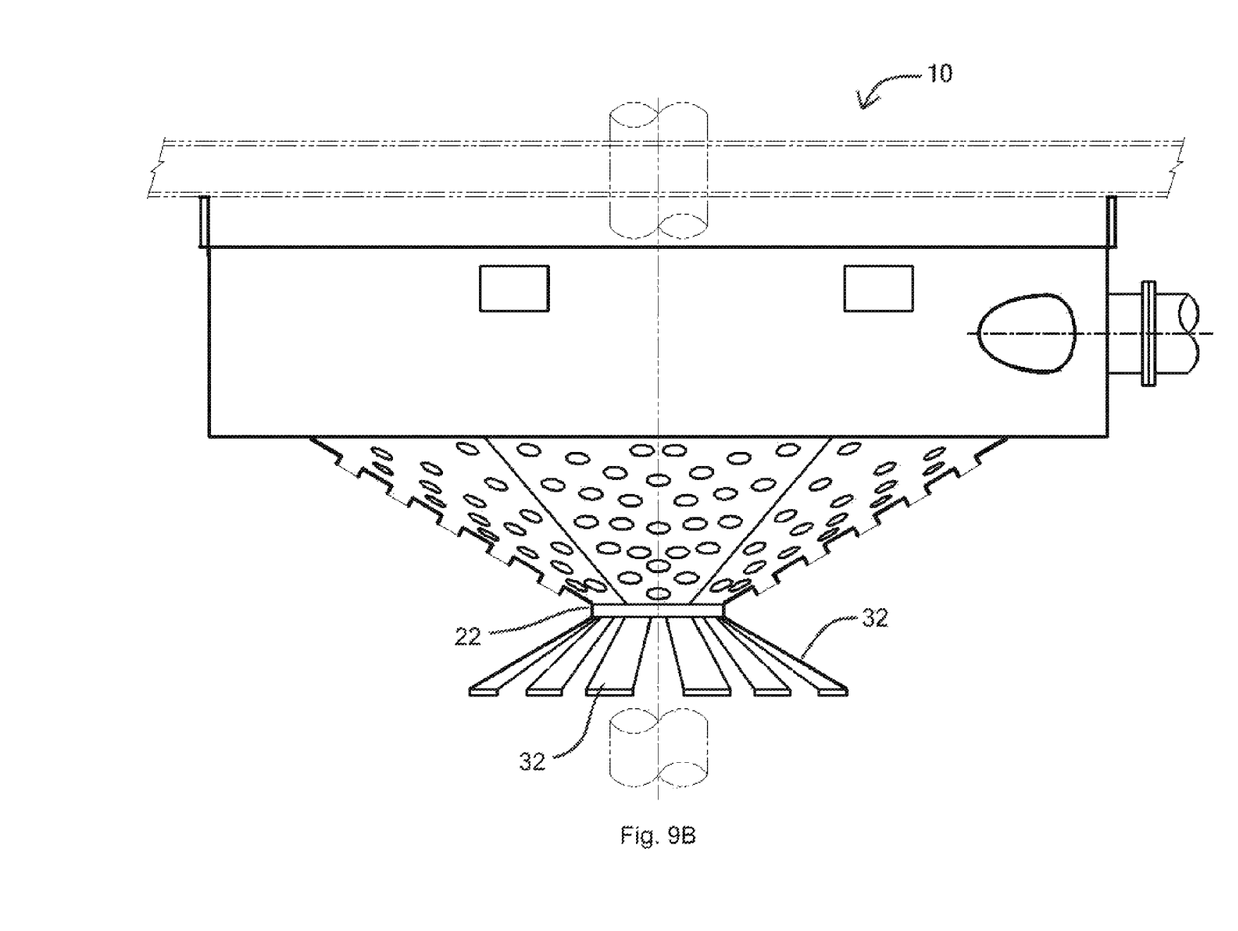

Optionally, as best illustrated in FIG. 8, the bottom of the feedwell can be formed from a plurality of individual sections 30 that can be welded, bolted, or otherwise connected together. Sections 30 can be made from a urethane material, carbon or stainless steel, rubber-coated steel, rubber, fiber glass, aluminum, other metals, other composites, other plastics including but not limited to nylon, materials that provide desired wear and/or wear-resistance characteristics, materials that provide desired corrosion and/or corrosion resistance characteristics, combinations thereof and the like. Optionally, sections 30 can have a wedge or pie shape, or any other shape which is capable of forming a bottom of a feedwell. Thus, when one or more sections 30 wear out, they can quickly and easily be replaced.

In one embodiment, feedwell bottom 14 preferably comprises a conical or otherwise downwardly-depending shape rather than a flat or upward-projecting shape as more typical feedwells have. Because of the downward-depending shape of bottom 14, the total volume of feedwell 10 is increased without requiring the diameter of feedwell 10 to be increased. Thus, compared to an upwardly-projecting bottom of a conventional feedwell, embodiments of the present invention provide a feedwell having a similar overall weight and diameter, but with significantly more internal volume—thus increasing the amount of retention, mixing, and floccule growth for the same size of footprint.

As best illustrated in FIGS. 9A, 9B, 10A, and 10B, in one embodiment, one or more structures 32 can be disposed on a lower portion of, or directly below feedwell 10. Structures 32 preferably promote further fluid flow modifications to achieve desired objectives for particular applications of feedwell 10. Although the one or more structures 32 can comprise any shape which is useful for achieving a particular objective for a given application of feedwell 10, in one embodiment, structures 32 can include, but are not limited to, an inverted cone, radially placed blades, combinations thereof, and the like. In one embodiment, one or more structures 32 can be incorporated into or otherwise communicably coupled to tube 22 disposed around hole 20, which can be disposed in a central location of bottom 14 of feedwell 10 (see FIGS. 9A and 9B).

Figure 10A:
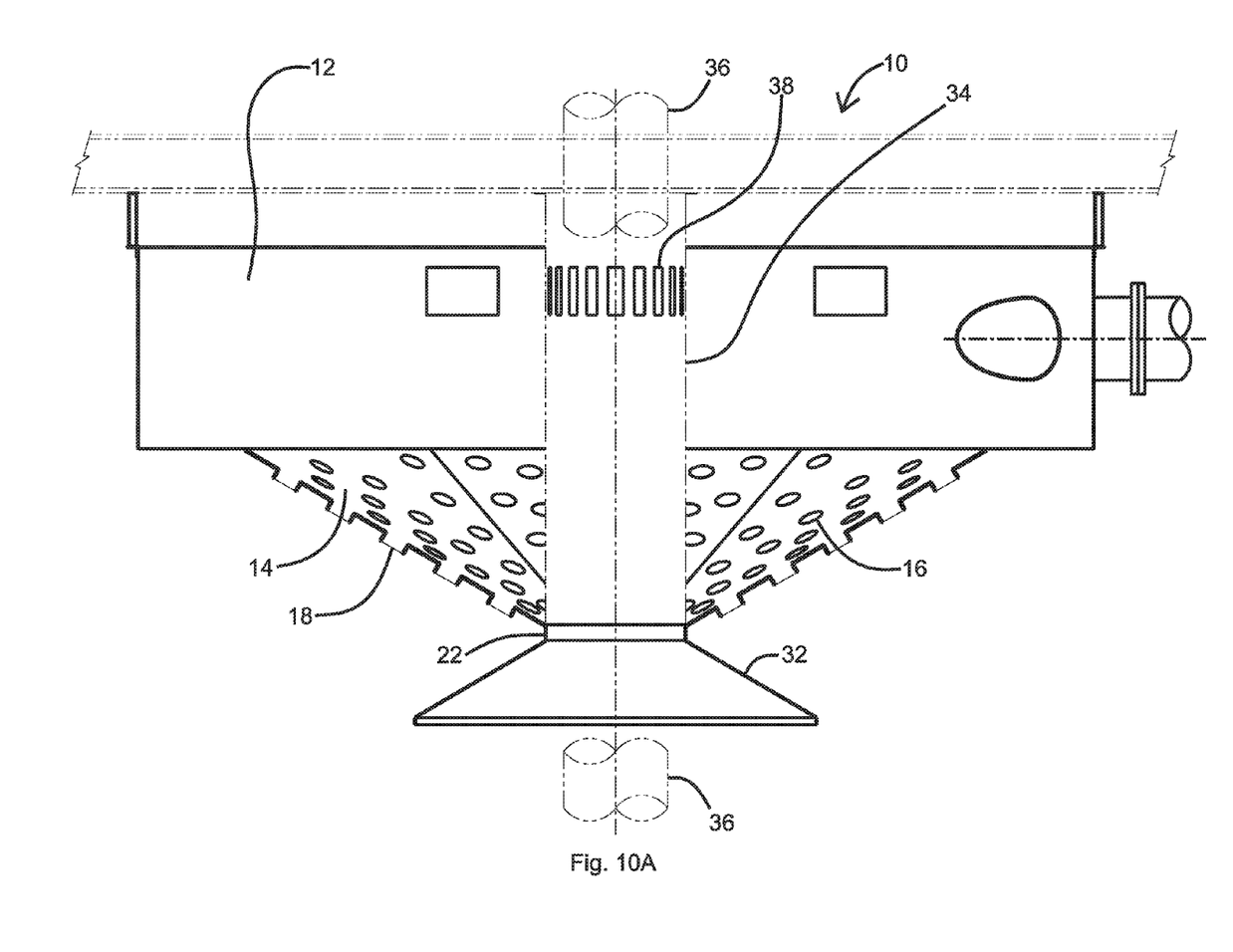
FIG. 10A and FIG. 10B are cut-away drawings which illustrate an embodiment wherein a vertical tube passes through the feedwell and wherein a fluid-flow modification structure is disposed on the lower end of the vertical tube.
Figure 10B:
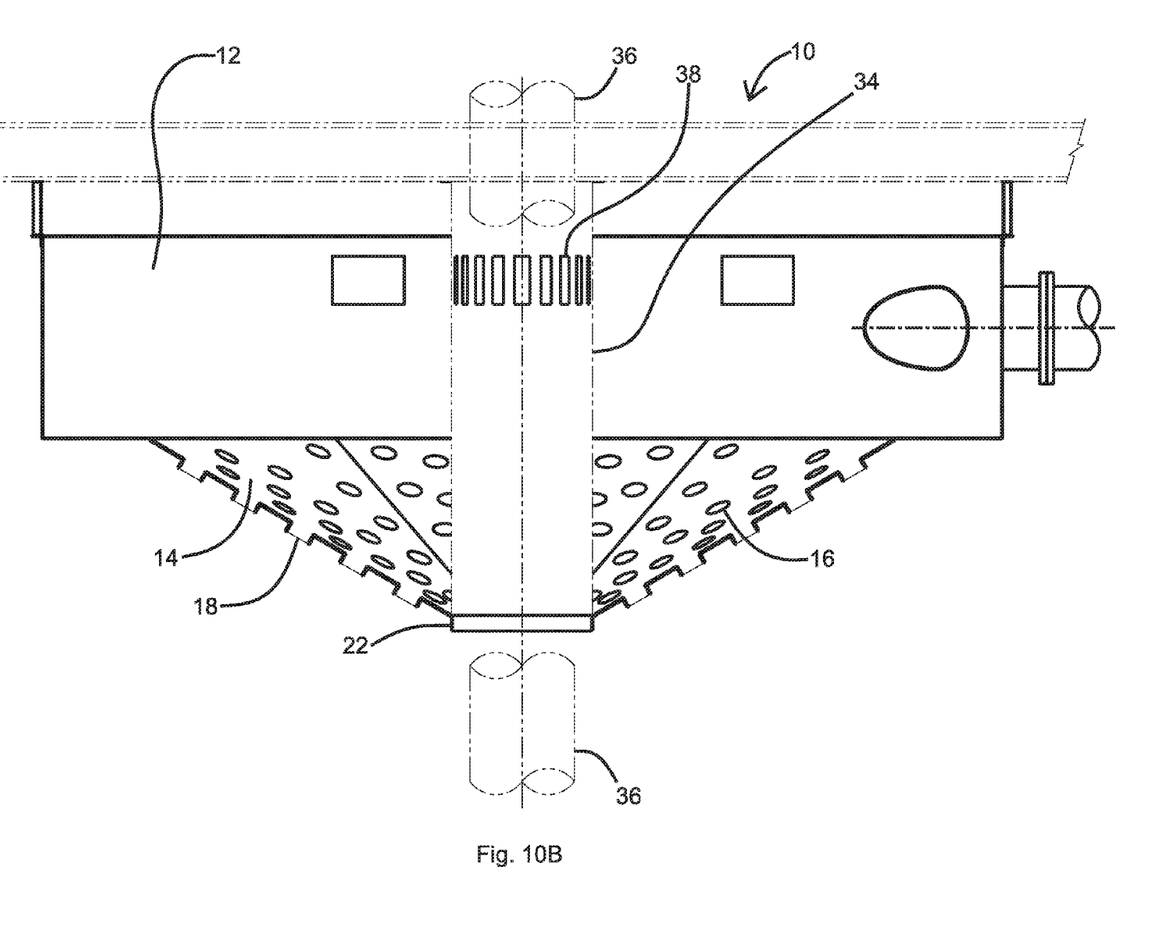
Figure 11:
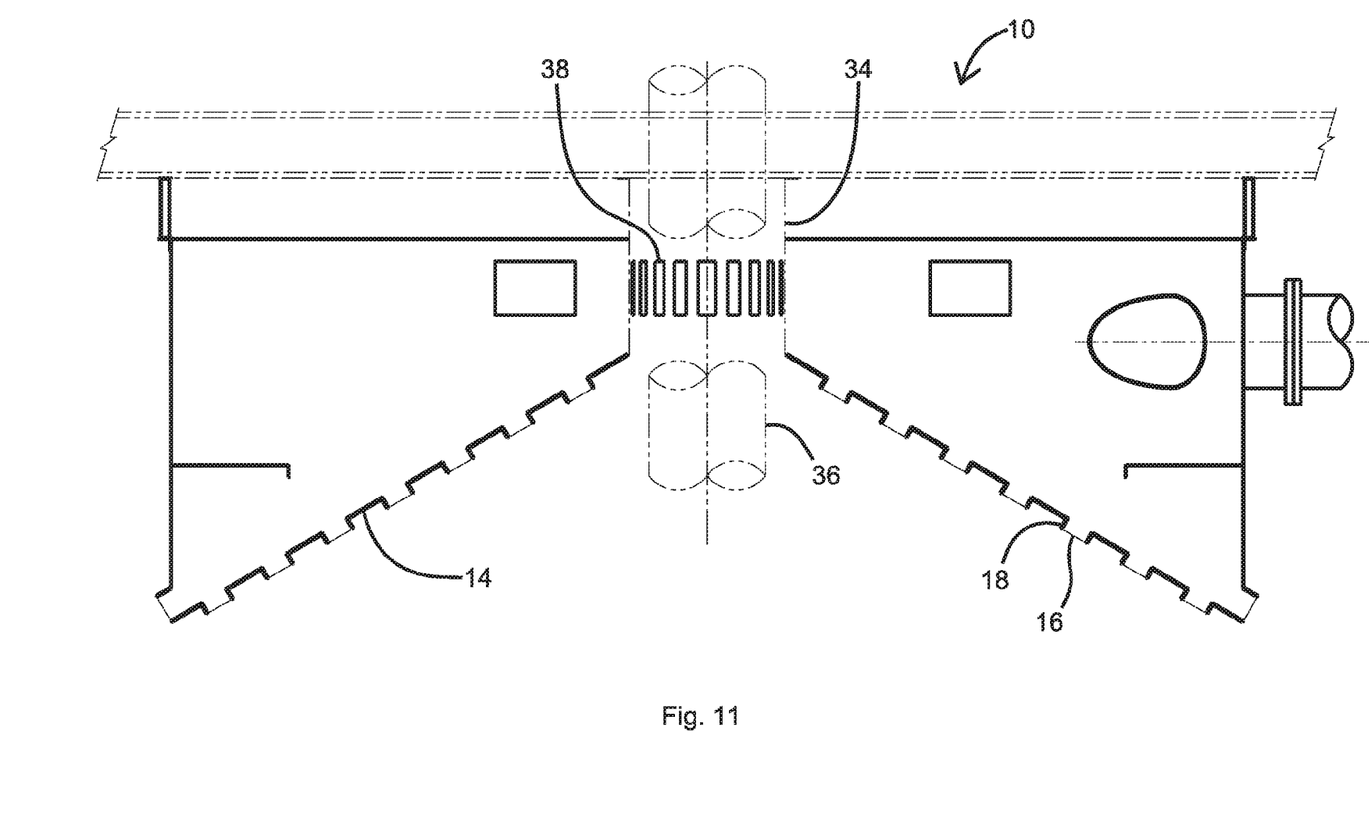
FIG. 11 is a cut-away side-view drawing which illustrates an embodiment wherein a vertical tube passes through the feedwell and wherein the bottom of the feedwell has an upwardly-projecting conical shape.

In an alternative embodiment, as is best illustrated in FIG. 10A, one or more structures 32 can be disposed around tube 34 which extends upwardly through feedwell 10. In another embodiment, as illustrated in FIG. 10B, tube 34, which extends upwardly through feedwell 10, can be communicably coupled to tube 22 disposed around hole 20, which can be disposed in a central location of bottom 14 of feedwell 10. Thus, in one embodiment, tube 34 can be disposed in an at least substantially central portion of feedwell 10. Optionally, as illustrated in FIGS. 10A, 10B, and 11, one or more openings 38 can be provided such that an interior of tube 34 is communicably coupled to an exterior thereof, and thereby an interior of tube 34 can be communicably coupled to an interior of feedwell 10. Tube 34 can be disposed within an interior of feedwell 10. In one embodiment, tube 34 can extend from the top of feedwell 10 to bottom 14 of feedwell 10. The one or more openings 38 are most preferably disposed near an upper portion of tube 34, but can optionally be disposed at one or more locations at any position along the length of tube 34 to promote further fluid flow modifications including feed dilution, fines capture, and recirculation to achieve desired objectives for particular applications. Elongated member 36, which can comprise a rotating shaft, one or more hydraulic hoses, or any other elongated structure, can optionally pass through or be disposed at least partially within tube 34.

As best illustrated in FIG. 11, bottom 14 of feedwell 10 can comprise an upwardly-projecting conical shape. As with other embodiments of feedwell 10, tube 34 can extend from a position above a top of feedwell 10 and can extend to bottom 14.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A feedwell comprising:
   a sidewall;
   at least one feed inlet disposed in said sidewall;
   a bottom;
   an at least substantially vertically-oriented tube disposed in an at least substantially central portion of said feedwell and passing from a top of said feedwell to said bottom, and wherein an interior of said at least substantially vertically-oriented tube is communicably coupled to an interior of said feedwell via one or more holes disposed in a sidewall of said vertically-oriented tube;
   at least three holes disposed in said bottom of said feedwell; and
   a tube disposed around at least one of said holes and projecting away from said interior of said feedwell.

2. The feedwell of claim 1 wherein at least a majority of said holes each comprise a corresponding said tube.

3. The feedwell of claim 1 further comprising at least one opening in said sidewall, said at least one opening being in addition to an opening for said feed inlet.

4. The feedwell of claim 3 wherein said at least one opening in said sidewall is disposed in an upper half of said sidewall.

5. The feedwell of claim 1 further comprising a central opening in said bottom of said feedwell.

6. The feedwell of claim 1 wherein said tube comprises a length which is greater than at least half of a diameter of said hole around which it is disposed.

7. The feedwell of claim 1 further comprising a fluid-flow modification structure disposed below said bottom.

8. The feedwell of claim 7 wherein said fluid-flow modification structure comprises a conical structure.

9. The feedwell of claim 7 wherein said fluid-flow modification structure comprises a plurality of fins.

10. The feedwell of claim 1 further comprising an exit velocity regulator communicably coupled to at least one of said holes.

11. The feedwell of claim 1 further comprising a flow rate regulator communicably coupled to at least one of said holes.

12. A feedwell comprising:
a sidewall;
a bottom, said bottom comprising a flat or at least substantially flat bottom nearest said sidewall, and the rest of said bottom comprising a downwardly-depending cone-shape;
a first opening in said bottom of said feedwell;
a plurality of second openings in said bottom of said feedwell;
each of said plurality of second openings comprising a cross-sectional area which is less than one-half of a cross-sectional area of said first opening; and
at least some of said second openings comprising a corresponding tube disposed around said openings which projects downward and away from an interior of said feedwell, said tube radially consistent in pattern or design.

13. The feedwell of claim 12 wherein said first opening is disposed in at least substantially a center portion of said bottom of said feedwell.

14. The feedwell of claim 12 further comprising an opening in an upper portion of said sidewall.

15. The feedwell of claim 12 further comprising at least one inlet, wherein said inlet is disposed in said sidewall.

16. The feedwell of claim 12 further comprising a plurality of openings in an upper portion of said sidewall.

17. The feedwell of claim 12 wherein said feedwell comprises an at least generally circular shape and wherein said plurality of second openings are arranged in an at least substantially radially consistent pattern.

18. The feedwell of claim 12 further comprising a fluid-flow modification structure disposed below said bottom.

19. The feedwell of claim 18 wherein said fluid-flow modification structure comprises a conical structure.

20. The feedwell of claim 18 wherein said fluid-flow modification structure comprises a plurality of fins.

21. A feedwell comprising:
a sidewall;
a bottom, said bottom comprising an upwardly-projecting conical shape;
a first opening in said bottom of said feedwell;
a plurality of second openings in said bottom of said feedwell;
each of said plurality of second openings comprising a cross-sectional area which is less than one-half of a cross-sectional area of said first opening; and
at least some of said second openings comprising a corresponding tube disposed around said openings which projects downward and away from an interior of said feedwell, said tube radially consistent in pattern or design.

22. The feedwell of claim 21 wherein said first opening is disposed in at least substantially a center portion of said bottom of said feedwell.

23. The feedwell of claim 21 further comprising an opening in an upper portion of said sidewall.

24. The feedwell of claim 21 further comprising at least one inlet, wherein said inlet is disposed in said sidewall.

25. The feedwell of claim 21 further comprising a plurality of openings in an upper portion of said sidewall.

26. The feedwell of claim 21 wherein said feedwell comprises an at least generally circular shape and wherein said plurality of second openings are arranged in an at least substantially radially consistent pattern.

27. The feedwell of claim 21 further comprising a fluid-flow modification structure disposed below said bottom.

28. The feedwell of claim 27 wherein said fluid-flow modification structure comprises a conical structure.

29. The feedwell of claim 27 wherein said fluid-flow modification structure comprises a plurality of fins.

\* \* \* \* \*